Nov. 13, 1956 K. A. MATTHEWS 2,770,763

ELECTRIC CRYSTAL RECTIFIERS

Filed Aug. 1, 1952

*Inventor*
K. A. MATTHEWS
By [signature]
*Attorney*

2,770,763

ELECTRIC CRYSTAL RECTIFIERS

Kenneth Albert Matthews, London, England, assignor to International Standard Electric Corporation, New York, N. Y., a corporation of Delaware Application August 1, 1952, Serial No. 302,065

Claims priority, application Great Britain August 29, 1951

6 Claims. (Cl. 317—236)

The present invention relates to electric crystal rectifiers.

The usual form of a crystal rectifier comprises a crystal of germanium or silicon or other suitable semiconductor, mounted on a metal base or holder, and having in contact with its surface a pointed wire or cat whisker. It is well known that the reverse resistance characteristic of rectifiers of this kind often has a portion where the resistance is negative and advantage of this circumstance may be taken to use a crystal rectifier to generate oscillations, or to provide simple triggering arrangements.

In the case of germanium crystal rectifiers, which are very efficient rectifiers for ordinary purposes, the negative resistance region is not reached until the applied reverse voltage is rather high, for example, about 100 volts.

Thus, when it is desired to make use of the negative resistance property, for example, when the device is used to generate oscillations, or in a trigger circuit, a reverse voltage of nearly 100 volts must be applied, so that considerable power is unavoidably dissipated, whereby the rectifier may be destroyed.

The principal object of the present invention is to provide a crystal rectifier in which the negative resistance region is reached with much lower reverse voltages. Another object is to increase the value of the negative resistance.

These objects are achieved according to the invention by providing an electric crystal rectifier comprising a semiconducting body of given conductivity type and having on its surface a layer of the opposite conductivity type, an electrode making low resistance substantially non-rectifying contact with part of the said layer, a thin film of the given conductivity type over a limited area of another part of the said layer, and a second electrode making rectifying contact with the said thin film, the two electrodes being spaced apart by a distance which lies between 0.001 and 0.01 inch.

The invention also provides an electric crystal rectifier comprising an N-type semi-conducting body having a surface treated for enhancing the rectification properties, a first electrode making low resistance substantially non-rectifying contact with part of the said surface, a limited area of another part of the said surface containing a donor type impurity, and a second electrode making rectifying contact with the said area of the surface, the two electrodes being spaced apart by a distance which lies between 0.001 and 0.01 inch.

The invention further provides an electric crystal rectifier comprising a P-type semi-conducting body having a surface treated for enhancing the rectification properties, a first electrode making low resistance substantially non-rectifying contact with part of the said surface, a limited area of another part of the said surface containing an acceptor type impurity, and a second electrode making rectifying contact with the said area of the surface, the two electrodes being spaced apart by a distance which lies between 0.001 and 0.01 inch.

The invention will be described with reference to the accompanying drawing, in which—

Figure 1:
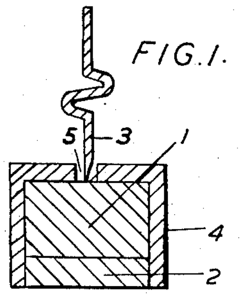
Fig. 1 shows a section of a crystal rectifier according to the invention.
Figure 2:
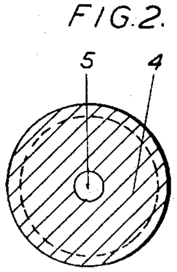
Fig. 2 shows a top view of the rectifier with the cat whisker removed.

The rectifier shown in Figs. 1 and 2 comprises a slice or disc 1 of a semiconducting crystal, such as a germanium crystal, cemented or soldered or otherwise firmly attached to a metal base electrode 2 and making a low resistance contact therewith. A fine, sharply pointed, wire or cat whisker 3 makes contact with the upper face of the crystal slice. The cat whisker is shown formed into an S-shape to provide some resilience.

The rectifier described so far is of a known type, but according to the present invention, the base electrode 2 is effectively extended over to the upper surface of the crystal slice by means of a plated coating 4 which covers the edges of the base electrode 2 and the whole exposed surface of the crystal slice, except for a small hole 5 through which the point of the cat whisker is able to make contact with the surface of the crystal. The size of the hole 5 is not important, but the point of the cat whisker 3 should be placed within about 0.002 inch of the edge of the coating 4. The best spacing between the electrodes will probably be found by trial, but will generally lie between 0.001 and 0.01 inch.

It is also necessary to apply between the cat whisker 3 and the coating 4 an electroforming treatment similar to that described and claimed in U. S. Patent 2,653,374, Serial No. 150,412, filed March 18, 1950, and issued September 29, 1953. If the semiconducting crystal is of the N-type (that is, the conduction of the current is principally by free electrons) the material of the cat whisker 3 should contain a small quantity of a donor type impurity such as arsenic or phosphorus, and the electroforming treatment should be carried out with the cat whisker 3 negative to the coating 4.

The electroforming treatment described in the above-identified patent is intended primarily for a crystal triode, and is carried out between the two cat whisker electrodes, for the purpose of injecting some of the impurity into the surface layer of the crystal. In the present case it is carried out between one cat whisker and the base electrode, and a slightly different result is obtained.

Figures 3, 6:
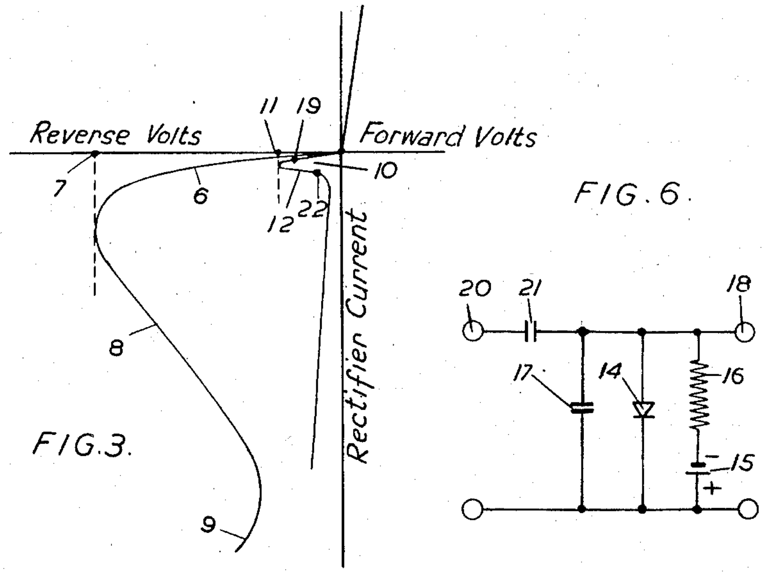
Fig. 3 shows a characteristic curve illustrating the process of electroforming the rectifier.
Fig. 6 shows an example of a trigger or oscillation circuit in which a rectifier according to the invention may be used.

Fig. 3 shows the relation between the voltage applied between the cat whisker 3 and the coating 4 in the reverse or high resistance direction, and the resulting current through the rectifier. The curve, before electroforming, follows the line 6, corresponding to a relatively high reverse resistance, until a critical voltage 7, called the "turnover voltage," is reached, when the curve quickly turns round and follows a portion 8 with a negative slope. As the curent through the rectifier is allowed to increase after the turnover point the voltage across the rectifier continues to fall rather rapidly until the negative resistance effect disappears and the slope of the curve again becomes positive as indicated by the portion 9. This curve is, of course the usual curve which will generally be found to apply to rectifiers formed by point contacts on semiconducting crystals such as germanium.

In the case of germanium, the turnover voltage corresponding to the point 7 is often of the order of 100 volts.

After electroforming in the manner described in the above-identified patent, it will be found that the loop 6, 8 is grealty reduced in magnitude as shown by the much smaller loop 10, the turnover voltage 11 being of the order of 25 volts, while at the same time the slope of the negative resistance portion 12 is much less than that of the portion 8, so that the magnitude of the negative resistance is much greater than before. This is important, because it facilitates the design of trigger circuits which employ the negative resistance effect.

As explained in the above-identified patent, when electroforming is carried out between two cat whiskers both of which make rectifying contact with the crystal, the effect is completely to remove the loop, so that the characteristic follows a smooth curve which has no portion with a negative slope. It has been found, however, that when one of the contacts is a substantially non-rectifying contact, the loop is greatly reduced, but does not disappear altogether.

It is generally considered that when an N-type germanium crystal is prepared in the conventional manner to enhance the rectification properties, for example by first polishing the surface and then etching with a solution containing hydrofluoric acid, nitric acid and copper nitrate, a very thin layer of P-type conductivity (that is the conduction of current is principally by electron deficiencies called "positive holes") is produced on the surface with which the cat whisker makes contact. The special properties according to the invention are believed to be due to the production over a very small area of the P-type layer of a further N-type layer by the electroforming treatment, in which a donor type of impurity (such as arsenic or phosphorus) is driven on to the surface of the crystal.

While it has been stated above that the spacing of the cat whisker 3 from the edge of the coating 4 should be about 0.002 inch, the best spacing will depend somewhat on the quality of the germanium and its surface treatment before electroforming, and can be found by trial. In practice, the best spacing will generally be found to lie with the limits 0.001 and 0.01 inch.

It should be added that although an N-type semiconducting crystal is preferred, it is possible to use a P-type semiconducting crystal, such as P-type germanium. This, when suitably treated for rectifying according to conventional methods, will have a thin N-type surface layer. In order to obtain the properties necessary for the present invention, the electroforming treatment should be carried out with a cat whisker 3 containing an acceptor impurity such as aluminium, and the cat whisker 3 should be positive to base electrode 4. In this way the impurity is driven on to the surface to form a P-type layer of small area on the surface of the N-type layer.

Figure 4:
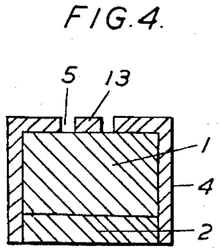
Fig. 4 shows a section of another form of crystal rectifier according to the invention.
Figure 5:
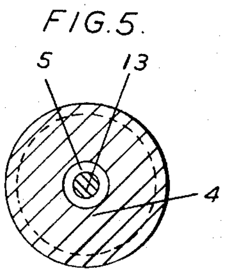
Fig. 5 shows a top view of the rectifier of Fig. 3.

In the form of the invention shown in Figs. 4 and 5, the cat whisker 3 is replaced by a metal film electrode 13 of small but appreciable area which is plated or otherwise deposited on the surface of the crystal according to the principles explained in the U. S. Patent 2,680,220 Serial No. 228,486, filed May 26, 1951, and issued June 1, 1954. By "appreciable area" is meant an area between $10^{-4}$ and 1 square millimetre. The electrode 13 occupies part of the area of the hole 5 and should be spaced about 0.002 inch from the edge of the coating 4. It need not be in the centre of the hole and need not be circular. A suitable terminal conductor wire (not shown) may be soldered or otherwise firmly attached to the electrode 13.

It is not essential to provide the metal base 2 or the cylindrical portions of the coating 4, which might consist simply of the portion on the top surface of the crystal slice, and it need not cover the whole area thereof. It is only essential that it should make a low resistance substantially non-rectifying contact with the crystal, and that the cat whisker or other rectifying electrode should be placed within about 0.002 inch of the edge of the coating or base. As already explained, the spacing may be between 0.001 and 0.01 inch. After electroforming in the manner described some of the impurity is driven on to the surface layer of the crystal, and reduces the turnover voltage as already explained.

Fig. 6 shows an example of a circuit in which a rectifier according to the invention may be used. It is similar to the circuit of Fig. 4 of British patent specification No. 650,007 filed 7/23/48 and published 5/23/51. The rectifier 14, which may be one of the forms described above, is biased in the reverse direction from a source 15 through a resistor 16, and is shunted by a capacitor 17. The upper end of resistor 16 is connected to an output terminal 18.

If the potential of the source 15 is greater than the turnover voltage, the circuit will behave as a relaxation oscillator. The capacitor 17 charges up through the resistor 16 until its potential reaches the turnover voltage, after which the current through the rectifier 14 increases suddenly and discharges the capacitor 17, which at the same time restores the rectifier to the positive resistance condition. The capacitor 17 then charges up again and the process is repeated. The oscillations, which are of substantially saw-tooth form, can be obtained from terminal 18. The action of this circuit is similar to that of the well known circuit in which the rectifier 14 is replaced by a gas-filled tube, in which the firing of the tube discharges the capacitor and at the same time extinguishes the tube.

If the potential of the source 15 is less than, but nearly equal to, the turnover voltage, no sustained oscillations occur, but the circuit is in a sensitive state and can be triggered between two conditions, in one of which the rectifier 14 is passing a small current, and in the other a large current. In this case, initially the rectifier is biased to a point 19 on the positive resistance portion of the loop 10 (Fig. 3) which point should preferably be very near to the turnover point. If a voltage pulse be applied to an input terminal 20 (Fig. 6) which is connected to the upper end of the rectifier 14 through a blocking capacitor 21, the rectifier will be switched over to the negative resistance condition and the current will suddenly change to a higher value corresponding to the point 22 (Fig. 3). The polarity of the pulse should of course be the same as that of the potential applied by the bias source 15 to the upper terminal of the rectifier 14.

Owing to the presence of the capacitor 17, the circuit is unstable and the current does not remain at the value corresponding to the value 22. The capacitor 17 is rapidly discharged by the increased current, and switches the rectifier back to the condition corresponding to the point 19. Thus in response to an input pulse applied to terminal 20, an amplified output pulse may be obtained from terminal 18.

If however the capacitor 17 is omitted, the rectifier will remain in the condition corresponding to the point 22. By the application of a pulse of opposite polarity to terminal 20 it may be switched back to the low current condition corresponding to the point 19. Thus if a train of alternately positive and negative pulses be applied to terminal 20, an output of rectangular waves will be obtained from terminal 18, if capacitor 17 be omitted.

The action of the capacitor 17 in restoring the rectifier 14 to the normal condition depends on the presence of stray inductance in the circuit, which is practically always present, and so does not have to be added. When the capacitor 17 is quickly discharged by the sudden increase in the rectifier current, the oscillatory condition produced by the stray inductance causes the potential of the capacitor to overswing to a low value to which would correspond a greatly increased rectifier current, because of the downward trend of the negative resistance portion of the characteristic curve (Fig. 3). The resistor 16 prevents the source 15 from supplying this increased current, and accordingly, the rectifier is forced to assume a condition corresponding to the positive resistance portion of the loop 10, compatible with the current as limited by the resistor 16.

While the principles of the invention have been described above in connection with specific embodiments and particular modifications thereof, it is to be clearly understood that this description is made by way of example and not as a limitation on the scope of the invention.

What we claim is:

1. An electric crystal rectifier comprising a semiconducting body of given conductivity type and having on its surface a layer of the opposite conductivity type, an electrode making low resistance substantially non-rectifying contact with part of the said layer, a thin film of said given conductivity type over a limited area of another part of said layer, and a second electrode making rectifying contact with the said thin film, the two electrodes being spaced apart by a distance of between 0.001 and 0.01 inch.

2. An electric crystal rectifier comprising an N-type semiconducting body having a surface treated for enhancing the rectification properties, a first electrode making low resistance substantially non-rectifying contact with part of the said surface, a limited area of another part of the said surface containing a donor type impurity, and a second electrode making rectifying contact with the said area of the surface, the two electrodes being spaced apart by a distance of between 0.001 and 0.01 inch.

3. An electric crystal rectifier comprising a P-type semiconducting body having a surface treated for enhancing the rectification properties, a first electrode making low resistance substantially non-rectifying contact with part of the said surface, a limited area of another part of the said surface containing an acceptor type impurity, and a second electrode making rectifying contact with the said area of the surface, the two electrodes being spaced apart by a distance of between 0.001 and 0.01 inch.

4. An electric crystal rectifier comprising a slice of N-type semiconducting crystal having a P-type layer on one surface, a metal base making low resistance substantially non-rectifying contact with the opposite surface of the slice, a metallic coating on part of the said layer and extending over the edge of the slice and over the said base to make electrical contact therewith, the said coating also making low resistance non-rectifying contact with the crystal slice, a second electrode placed on another part of the said layer and making rectifying contact therewith and being spaced from the edge of said coating by a distance of 0.001 to 0.01 inch, and a thin film having N-type conductivity on the said layer in the neighborhood of the said second electrode.

5. An electric crystal rectifier comprising a slice of P-type semiconducting crystal having a N-type layer on one surface, a metal base making low resistance substantially non-rectifying contact with the opposite surface of the slice, a metallic coating on part of the said layer and extending over the edge of the slice and over the said base to make electrical contact therewith, said coating also making low resistance contact with the crystal slice, a second electrode placed on another part of the said layer and making rectifying contact therewith and being spaced from the edge of the said coating by a distance of 0.001 to 0.01 inch, and a thin film having P-type conductivity on the said layer in the neighbourhood of said second electrode.

6. A rectifier according to claim 1, in which the said second electrode comprises a sharply pointed wire making substantially point contact with the said opposite surface.

References Cited in the file of this patent

UNITED STATES PATENTS

| | | |
|---|---|---|
| 2,565,497 | Harling | Aug. 28, 1951 |
| 2,592,683 | Gray | Apr. 15, 1952 |
| 2,629,767 | Nelson et al. | Feb. 24, 1953 |
| 2,680,220 | Starr et al. | June 1, 1954 |
| 2,713,132 | Matthews et al. | July 12, 1955 |